United States Patent
McLeod et al.

(10) Patent No.: US 7,863,849 B2
(45) Date of Patent: Jan. 4, 2011

(54) DELTA-SIGMA MODULATOR FOR A FAN DRIVER

(75) Inventors: Scott C. McLeod, Oro Valley, AZ (US); Chao-Ming Tsai, Tucson, AZ (US)

(73) Assignee: Standard Microsystems Corporation, Hauppauge, NY (US)

(*) Notice: Subject to any disclaimer, the term of this patent is extended or adjusted under 35 U.S.C. 154(b) by 482 days.

(21) Appl. No.: 12/040,554

(22) Filed: Feb. 29, 2008

(65) Prior Publication Data

US 2009/0220219 A1   Sep. 3, 2009

(51) Int. Cl.
   *G05B 19/29* (2006.01)
(52) U.S. Cl. .................. 318/600; 318/568.15; 318/569; 318/603; 318/268
(58) Field of Classification Search ............ 318/568.15, 318/569, 573, 599, 600, 268, 720, 721; 388/809, 388/811, 819, 828, 829; 341/21, 30, 122, 341/123, 143
   See application file for complete search history.

(56) References Cited

U.S. PATENT DOCUMENTS

| | | | |
|---|---|---|---|
| 4,382,218 A | 5/1983 | McVey | |
| 4,459,519 A | 7/1984 | Erdman | |
| 4,530,395 A | 7/1985 | Parker et al. | |
| 4,667,480 A | 5/1987 | Bessler | |
| 4,702,413 A | 10/1987 | Beckey et al. | |
| 4,722,669 A | 2/1988 | Kundert | |
| 4,727,468 A | 2/1988 | Maekawa | |
| 4,828,088 A | 5/1989 | Mohan et al. | |
| 4,856,078 A | 8/1989 | Konopka | |
| 4,856,286 A | 8/1989 | Sulfstede et al. | |
| 4,978,896 A | 12/1990 | Shah | |
| 5,142,286 A * | 8/1992 | Ribner et al. | ............ 341/143 |
| 5,249,741 A | 10/1993 | Bistline et al. | |
| 5,271,558 A | 12/1993 | Hampton | |
| 5,307,439 A | 4/1994 | Enami | |
| 5,379,606 A | 1/1995 | Katsuki et al. | |

(Continued)

OTHER PUBLICATIONS

Johns, et al.; "Analog Integrated Circuit Design"; John, Wiley & Sons; 1996, p. 550.

(Continued)

*Primary Examiner*—Walter Benson
*Assistant Examiner*—Thai Dinh
(74) *Attorney, Agent, or Firm*—Meyertons Hood Kivlin Kowert & Goetzel, P.C.; Jeffrey C. Hood

(57) ABSTRACT

A fan driver circuit for powering a fan with a linear voltage may be designed using digital design techniques, resulting in a testable, accurate circuit on a smaller die size. The fan driver circuit may be configured to receive a digital control signal, which may be a sequence of numeric values, e.g. multiple-bit binary numbers, each indicative of a desired present rotational speed of the fan. The fan driver circuit may be implemented using a digital modulator, e.g. a delta-sigma modulator, with a simple low-pass filter, e.g. an RC-filter at the output, and may use oversampling based on a system clock, to shift in-band noise to out-of-band frequencies, and digital interpolation to filter out unwanted images from the upsampled digital control signal. The delta-sigma modulator may be constructed as a first-order delta-sigma modulator using an error-feedback structure to reduce die size.

25 Claims, 3 Drawing Sheets

U.S. PATENT DOCUMENTS

| | | | |
|---|---|---|---|
| 5,447,414 A | 9/1995 | Nordby et al. | |
| 5,511,724 A | 4/1996 | Freiberger et al. | |
| 5,563,480 A | 10/1996 | Okada | |
| 5,687,079 A | 11/1997 | Bauer et al. | |
| 5,727,928 A | 3/1998 | Brown | |
| 5,825,972 A | 10/1998 | Brown | |
| 5,872,733 A | 2/1999 | Buti et al. | |
| 5,896,736 A | 4/1999 | Rajamani | |
| 5,942,866 A | 8/1999 | Hsieh | |
| 5,945,870 A | 8/1999 | Chu et al. | |
| 5,962,933 A | 10/1999 | Henderson et al. | |
| 5,990,582 A | 11/1999 | Henderson et al. | |
| 6,029,119 A | 2/2000 | Atkinson | |
| 6,147,465 A | 11/2000 | Hollenbeck | |
| 6,182,902 B1 | 2/2001 | Shih | |
| 6,188,189 B1 | 2/2001 | Blake | |
| 6,194,858 B1 | 2/2001 | Chen | |
| 6,204,623 B1 | 3/2001 | Levy et al. | |
| 6,208,538 B1 | 3/2001 | Halamik et al. | |
| 6,211,635 B1 | 4/2001 | Kambe et al. | |
| 6,226,324 B1 | 5/2001 | Allstrom | |
| 6,247,898 B1 | 6/2001 | Henderson et al. | |
| 6,262,549 B1 | 7/2001 | Yang et al. | |
| 6,278,392 B1 * | 8/2001 | Nestler | 341/143 |
| 6,313,441 B1 | 11/2001 | Schaper et al. | |
| 6,366,049 B1 | 4/2002 | Chen et al. | |
| 6,380,704 B1 | 4/2002 | Chin | |
| 6,381,406 B1 | 4/2002 | Smith et al. | |
| 6,385,395 B1 | 5/2002 | Horng et al. | |
| 6,392,372 B1 * | 5/2002 | Mays, II | 318/400.01 |
| 6,448,896 B1 | 9/2002 | Bankus et al. | |
| 6,481,974 B2 | 11/2002 | Horng et al. | |
| 6,519,167 B1 | 2/2003 | Nguyen | |
| 6,526,333 B1 | 2/2003 | Henderson et al. | |
| 6,528,987 B1 | 3/2003 | Blake et al. | |
| 6,563,284 B2 | 5/2003 | Teutsch et al. | |
| 6,601,168 B1 | 7/2003 | Stancil et al. | |
| 6,617,815 B1 | 9/2003 | Krief | |
| 6,646,396 B2 | 11/2003 | Brown et al. | |
| 6,650,074 B1 | 11/2003 | Vyssotski et al. | |
| 6,661,679 B1 | 12/2003 | Yang et al. | |
| 6,674,369 B1 | 1/2004 | Riddoch | |
| 6,693,410 B1 | 2/2004 | Terrien | |
| 6,703,803 B2 | 3/2004 | Ohiwa et al. | |
| 6,737,860 B2 | 5/2004 | Hsu et al. | |
| 6,747,424 B1 | 6/2004 | Malik et al. | |
| 6,757,592 B1 | 6/2004 | Henderson et al. | |
| 6,765,422 B1 | 7/2004 | Aslan et al. | |
| 6,778,938 B1 | 8/2004 | Ng et al. | |
| 6,793,879 B2 | 9/2004 | Bayer et al. | |
| 6,812,737 B2 | 11/2004 | Sueyoshi et al. | |
| 6,874,327 B1 | 4/2005 | Wahler et al. | |
| 6,879,120 B2 * | 4/2005 | Xi | 318/400.01 |
| 6,885,160 B2 | 4/2005 | Takeuchi | |
| 6,919,703 B2 | 7/2005 | Marando et al. | |
| 6,924,568 B2 | 8/2005 | Dhuey | |
| 6,933,697 B2 | 8/2005 | Marando et al. | |
| 6,997,684 B2 | 2/2006 | Hahn et al. | |
| 7,026,775 B2 | 4/2006 | Kokubo et al. | |
| 7,029,239 B2 | 4/2006 | Marando et al. | |
| 7,038,408 B2 | 5/2006 | Lin et al. | |
| 7,064,511 B2 | 6/2006 | Marando et al. | |
| 7,069,172 B2 | 6/2006 | Bekker et al. | |
| 7,075,261 B2 | 7/2006 | Burstein | |
| 7,076,159 B2 | 7/2006 | Bekker | |
| 7,092,623 B2 | 8/2006 | Bekker | |
| 7,096,134 B2 | 8/2006 | Miller, Jr. | |
| 7,109,670 B1 | 9/2006 | Rehm | |
| 7,132,809 B1 | 11/2006 | Chang | |
| 7,135,826 B2 | 11/2006 | Ma et al. | |
| 7,151,349 B1 | 12/2006 | Williamson et al. | |
| 7,211,977 B2 | 5/2007 | Squibb | |
| 7,218,073 B2 | 5/2007 | Huang et al. | |
| 7,245,095 B2 | 7/2007 | Hsu | |
| 7,279,857 B2 * | 10/2007 | Babb et al. | 318/400.23 |
| 7,295,897 B2 | 11/2007 | Marando et al. | |
| 7,340,367 B2 | 3/2008 | Inoue et al. | |
| 7,362,060 B2 | 4/2008 | Tembreull et al. | |
| 2003/0011332 A1 | 1/2003 | Mays, II | |
| 2003/0137267 A1 | 7/2003 | Blake | |
| 2003/0234630 A1 | 12/2003 | Blake | |
| 2007/0075675 A1 | 4/2007 | Hsu | |
| 2007/0162160 A1 | 7/2007 | Chang et al. | |
| 2008/0036403 A1 | 2/2008 | Ma et al. | |
| 2008/0088263 A1 | 4/2008 | Lee | |
| 2008/0088463 A1 | 4/2008 | Wu et al. | |
| 2008/0095521 A1 | 4/2008 | Chen et al. | |

OTHER PUBLICATIONS

Liu, Mingliang; "Tutorial on Designing Delta-Sigma Modulators: Part 1"; CommsDesign; Mar. 30, 2004; retrieved from Internet: http://www.commsdesign.com/showArticle.jhtml?articleID=18402743; 10 pages.

"dBCOOL Remote Thermal Controller and Voltage Monitor—ADM1027"; Analog Devices; 2003. 56 pages.

"LM63: +35 1°C/+35 3°C Accurate Remote Diode Digital Temperature Sensor with Integrated Fan Control"; National Semiconductor Corporation; May 2003; 28 pages.

Ohr, Stephan; "Analog IC vendors find 'Intel Inside' a safe bet"; Ee Times; retrieved from Internet: www.eetimes.com/story/OEG20020912S0026; Sep. 12, 2002; 4 pages.

* cited by examiner

DELTA-SIGMA MODULATOR FOR A FAN DRIVER

BACKGROUND OF THE INVENTION

1. Field of the Invention

This invention relates generally to the field of digital circuit design and, more particularly, to the design of a driver circuit to power a fan.

2. Description of the Related Art

Fans are often used to evacuate warm air from enclosures in which electronic systems are contained. For example, most computer systems include one or more cooling fans to aid in circulating the air inside the enclosures and for maintaining the temperature inside the enclosures within an acceptable range. The increased airflow provided by fans typically aids in eliminating waste heat that may otherwise build up and adversely affect system operation. Employing cooling fans is especially helpful in ensuring proper operation for certain central processing units (CPUs) with relatively high operating temperatures.

Control of fans in a system typically involves a fan control unit executing a fan control algorithm. A fan control algorithm may determine the method for controlling one or more fans that are configured to evacuate warm air from a system enclosure. For example, the fan control algorithm may specify that a fan's rotational speed should be increased or decreased dependent upon a detected temperature. Such control algorithms may also involve turning off a fan if the temperature is deemed cool enough to do so, or in certain systems, such as personal computers (PCs) for example, lowering the rotational speed of the fan and allowing the fan to continue running at a minimum rotational speed.

Some fan drive systems use a signal generator that provides a Pulse Width Modulated (PWM) signal to drive an external circuit that controls the voltage between the power and ground interfaces of the fan, which in turn controls the rotational speed of the fan. Signal generators that provide PWM signals are useful because they provide a digital control for the pulse width of a signal. The fan is typically powered only for the duration of the pulse. Between pulses power to the fan is turned off, although the fan is typically still spinning during this time. The duty cycle of the PWM pulse train presently being provided to the fan determines the fan's rotational speed. Another typical way to control three-wire fans is to drive the fan by utilizing a high side Field Effect Transistor (FET), thereby controlling the DC voltage supplied to the fan. Generally, this provides an effective dynamic control range of 3V, which typically ranges from 5V down to around 2V. The lower limit voltage (2V) is still sufficient to power the fan circuitry, and valid tachometer signals may still be obtained from the fan.

In some instances, alternatives to a PWM generator may be preferred for driving the fan, while retaining digital control of the fan. For example, certain systems may best be configured using fans that are powered by a linear control voltage, while other systems may be configured with fans that are pulse powered, but an alternative to a PWM generator is still preferred. In such cases, it may be desirable to provide a driver circuit that is capable of providing either pulses or a linear voltage to power the fan, while also generating the pulses or the linear voltage based on digital control signal or signals. In addition, with ever increasing requirements for smaller die size and accuracy, it may be desirable to design a fan driver circuit that can provide a highly power signal to the fan, and can be implemented with standard digital design techniques, which would allow for both compactness due to smaller size, and higher accuracy due to better testability.

Other corresponding issues related to the prior art will become apparent to one skilled in the art after comparing such prior art with the present invention as described herein.

SUMMARY OF THE INVENTION

In one set of embodiments, a driver circuit for powering a fan with either pulses or with a linear voltage may be designed using digital design techniques, resulting in a testable, accurate circuit on a smaller die size. The driver circuit may receive a digital control signal, which may be a numeric value or sequence of numeric values indicative of a desired present rotational speed of the fan, and may be implemented using a delta-sigma modulator. When a linear voltage is desired to power the fan, the driver circuit may also include a simple low-pass filter, e.g. an RC-filter. The driver circuit may be configured to perform oversampling and interpolation, using a system clock for example, to shift in-band noise to out-of-band frequencies which may later be filtered out, ultimately reducing quantization noise. In one set of embodiments, the delta-sigma modulator may be constructed as a first-order delta-sigma modulator using an error-feedback structure to reduce die size. In other embodiments, the delta-sigma modulator may be a higher-order modulator.

In one set of embodiments, the fan drive circuit may include a first circuit having an input configured to receive successive numeric values at a first rate, each of the successive numeric values indicating the desired present rotational speed of the fan. The first circuit may be configured to upsample the successive numeric values at a second rate higher than the first rate, to achieve oversampling, and provide as its output successive interpolated numeric values based on the successive numeric values according to the second rate. The drive circuit may further include a digital modulator, e.g. a delta-sigma modulator, which may be configured to receive the successive interpolated numeric values from the output of the first circuit, and generate a corresponding pulse for each of the successive interpolated numeric values, to obtain a series of successive pulses. The successive pulses may be provided to power the fan, assuming the fan may be pulse powered. Alternatively, a filter, e.g. an analog low-pass filter, may be coupled to the output of the digital modulator to generate a linear control voltage based on the series of successive pulses, and provide the linear control voltage to power the fan. In either case, as a result, the present rotational speed of the fan may thereby correspond to the desired present rotational speed of the fan indicated by the successive numeric values.

The digital modulator may be implemented as a second-order delta-sigma modulator, a first-order delta-sigma modulator, or a first-order error-feedback delta-sigma modulator, or a number of other types of modulators. For example, it may be a higher order delta-sigma modulator (i.e. even higher than second-order). It may be implemented to provide a single level output or multiple-level outputs as desired. The rate at which the successive interpolated numeric values are provided to the digital modulator may be derived from a system clock, which may be the system clock of an actual computer system which the fan is configured to cool. The successive numeric values may be digital control signals, or present values of a digital control signal generated by either control hardware configured to control the fan, or control software executing on a computer system, e.g. the computer system which the fan may be configured to cool. The digital modulator may be implemented as an integrated circuit, which may be designed using standard-cell design techniques, making it fully scanable and testable.

In one set of embodiments, a series of pulses for powering a fan, or a linear voltage for powering a fan may be generated from a digital control signal, e.g. a sequence of numeric values represented as multi-bit binary numbers, indicative of a desired rotational speed of the fan by oversampling the digital control signal at a rate corresponding to an oversampling clock, and generating an interpolated digital signal corresponding to the oversampled digital control signal. A series of pulses based on the interpolated digital signal may then be generated, where a density of the series of pulses may be representative of the value of the digital control signal. The series of pulses may be used to power the fan when the fan is configured to be powered by pulses. Alternatively, a linear control voltage may be obtained from the series of pulses, and the fan may then be powered by the linear voltage when the fan is configured to be powered by pulses. Deriving a series of pulses that correspond to the sequence of numeric values, and obtaining the linear voltage from the series of pulses, results in a present rotational speed of the fan matching the desired rotational speed of the fan indicated by the sequence of numeric values (i.e. the digital control signal), whether the fan is powered by the series of pulses or by the linear voltage. The digital control signal, or sequence of numeric values, may be received from control hardware configured to control the fan, or control software executing on a computer system that the fan is configured to cool. Quantization noise may be filtered out from the linear voltage prior to providing the linear voltage to power the fan. It should be noted that the sequence of numeric values may simply include a single numeric value for an extended period of time, or may change frequently, depending on what the desired present rotational speed of the fan may be.

Therefore, in one embodiment, a cooling system may be implemented using at least one fan, an interpolating circuit, a first-order error-feedback delta-sigma modulator, and a low-pass filter. The interpolating circuit may receive a numeric value indicative of a desired rotational speed of the at least one fan, and may provide interpolated numeric values based on the numeric value according to a frequency of an oversampling clock. The delta-sigma modulator may receive the interpolated numeric values from the interpolating circuit, and may generate a series of successive pulses corresponding to the interpolated numeric values. The output from the delta-sigma modulator may be provided to the at least one fan to power the at least one fan when the at least one fan is configured to be powered by pulses. Alternatively, the series of successive pulses may be provided to a low-pass filter, e.g. an RC-filter, to generate a linear voltage signal based on the series of successive pulses, and use the linear voltage to power the at least one fan when the at least one fan is configured to be powered by a linear voltage. Whether powered by the series of successive pulses or the linear voltage, the at least one fan may thereby rotate at a present rotational speed that corresponds to the desired rotational speed.

Thus, new fan drive circuits delivering a linear voltage to power fans may be implemented using digital design techniques, resulting in a smaller die size and more accurate fan control while consuming less power than similar analog circuits designed to provide power to fans. The new fan drive circuits may be implemented using standard-cell design techniques, making the circuits scanable, thereby providing increased testability.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
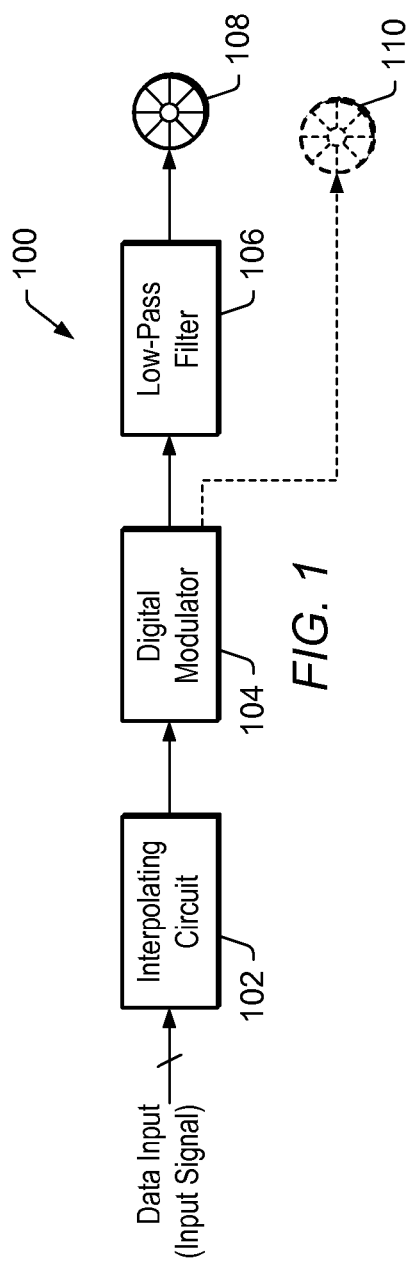
FIG. 1 shows a block diagram of one embodiment of a fan drive circuit that can be configured to provide a pulse-driven output or a linear voltage driven output.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, when referencing a pulse of a signal, a "leading edge" of the pulse is a first edge of the pulse, resulting from the value of the signal changing from a default value, and a "trailing edge" is a second edge of the pulse, resulting from the value of the signal returning to the default value. A first signal is said to be "corresponding" to a second signal if the first signal was generated in response to the second signal. When data is said to be "registered" or "latched" "using" a signal, the signal acts as a trigger signal that controls the storing of the data into the register or latch. In other words, when a signal "used" for registering or latching data is in its triggering state, the data residing at respective input ports of the register or latch is stored into the register or latch. Similarly, when data is latched "on the leading edge" or "on the trailing edge" of a pulse of a clock, the data residing at respective input ports of a register or latch is stored into the register or latch, respectively, when a leading edge or a trailing edge of a pulse of the clock occurs, respectively. A first signal is said to "propagated based on" a second signal, when the second signal controls the propagation of the first signal. Similarly, a first module is said to "use" a clock signal to transfer data to a second module, when propagation of the data from the first module to the second module is controlled and/or triggered by the clock signal. When referencing a binary number, the least significant bit (LSB) is understood to be the rightmost bit of the binary number, whereas the most significant bit (MSB) is understood to be the leftmost bit of the binary number. For example, in case of the binary number '011' the LSB would be '1' while the MSB would be '0'.

FIG. 1 shows a driver circuit 100 for powering a fan 108 with a linear voltage, or powering a fan 110 with a series of successive pulses. At least digital modulator 104 of driver circuit 100 may be designed using digital design techniques, resulting in a testable, accurate circuit on a smaller die size. Driver circuit 100 may include a first circuit 102, which is shown here as an interpolating circuit, configured to receive a digital data input, which may be a binary number having a specified number of bits. Overall, the digital data input may be a digital (input) signal comprising one or more numeric values indicative of a desired present rotational speed of fan 108 (and/or fan 110). Fan 108 and fan 110 are shown to illustrate that fan 108 may be powered by a linear voltage while fan 110 may be powered by a series of successive pulses. Those skilled in the art will recognize that the number of fans and their coupling to the driver circuit may vary, and that the exact combination illustrated in FIG. 1 is meant only to serve as an example of one possible embodiment.

The data input may vary over time, and may be provided to first circuit 102 as successive numeric values input to interpolating circuit at a given first rate, which in this case may be considered a target sampling rate. In each case, the value of the input signal may correspond to a desired value of the rotational speed of the fan. For example, in one set of embodiments, the input signal may be a multi-bit, or multiple-bit binary signal representing binary numbers that correspond to a desired rotational speed of the fan. Consequently, interpolating circuit 102 may sample the data input at a frequency higher than the frequency at which the data input may be provided to its input. The higher frequency may be the oversampling frequency and may be achieved through the use of a system clock, for example. First circuit 102 may thereby operate to provide interpolated values corresponding to each data input to the digital modulator 104 at a frequency corresponding to an oversampling clock.

Digital modulator 104, which may be a delta-sigma modulator, may be configured to receive the successive interpolated numeric values from the output of the first circuit 102, and generate a corresponding pulse for each of the successive interpolated numeric values, to obtain a series of successive pulses. Digital modulator 104 may in effect be performing a delta-sigma function, to provide a pulse density modulated (PDM) bitstream to the input of filter 106, which may be an analog low-pass filter, to generate a linear control voltage at the output of filter 106, based on the series of successive pulses. The thereby generated linear voltage may then be provided to fan 108 for powering fan 108. Alternatively, as also indicated in FIG. 1, the output of digital modulator, when the digital modulator is a single-bit modulator, may equally be coupled to a fan 110, to have the series of successive pulses power fan 110. As a result, the present rotational speed of fan 108 and fan 110 may correspond to the desired present rotational speed of the fan indicated by the numeric value, or successive (changing) numeric values provided to interpolating circuit 102 as the digital control input to fan drive circuit 100.

The digital modulator 104 may be implemented in a variety of ways. For example, in certain embodiments digital modulator 104 may be a second-order delta-sigma modulator, while other embodiments may feature a first-order delta-sigma modulator, and in yet other embodiments it may be a first-order error-feedback delta-sigma modulator. Other embodiments may also feature higher order modulators. The rate at which the successive interpolated numeric values are provided to digital modulator 104 may be derived from a system clock, which may be the system clock of an actual computer system which fan 108 and/or fan 100 (or in general the fan powered by the drive circuit) may be configured to cool. The successive numeric values may constitute a digital control signal, or may be included in a digital control signal, and may be generated by either control hardware configured to control fan 108 (and/or fan 110), or control software executing on a computer system, e.g. the computer system which the fan 108 (and/or fan 110) may be configured to cool. The digital modulator 104 may be implemented as an integrated circuit, which may be designed using standard-cell design techniques, making it fully scanable and testable.

Figure 2:
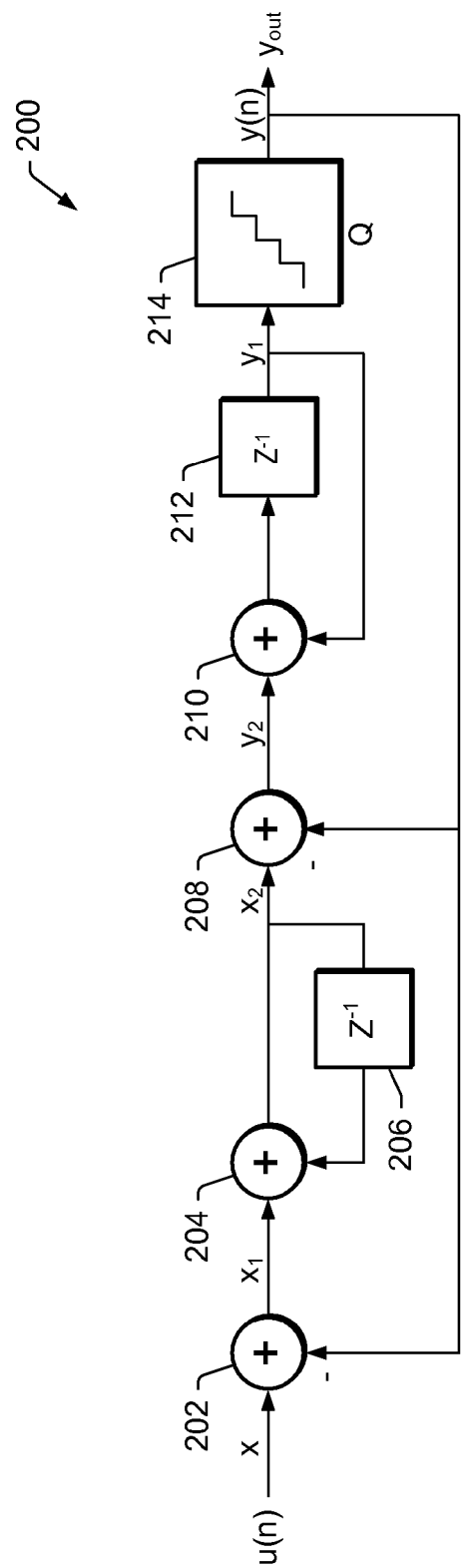
FIG. 2 shows a control diagram of one embodiment of a second order implementation of the digital modulator of FIG. 1.

Therefore in at least one embodiment, a cooling system may be implemented using at least fan 108 (and/or fan 110), an interpolating circuit 102, a first-order error-feedback delta-sigma modulator 104, and a low-pass filter 106, as shown in FIG. 1. In one embodiment, delta-sigma modulator 104 may be a second-order delta-sigma modulator 200 as shown in FIG. 2. The output from interpolating circuit 102 may be the input u(n) to delta-sigma modulator 200, which may comprise sigma blocks 202, 204, 208, and 210, and integrating blocks 206 and 212 forming two main feedback loops. The principle of the delta-sigma modulator architecture is to make rough evaluations of the signal, to measure the error, integrate it and then compensate for that error. Thus, the mean output value may then be equal to the mean input value if the integral of the error is finite. The number of integrators (hence the number of feedback loops) indicates the order of the delta-sigma modulator. For the delta-sigma modulator 200 of FIG. 2, the following equations may be obtained:

$$x_1 = x - y_{out} \tag{1}$$

$$x_2 = x_1 + z^{-1} x_2, \tag{2}$$

from which:

$$x_2 = \frac{x_1}{1 - z^{-1}}, \tag{3}$$

$$y_2 = x_2 - y_{out}, \tag{4}$$

$$y_1 = (y_2 + y_1) z^{-1}, \tag{5}$$

leading to:

$$y_1 = \frac{z^{-1}}{1 - z^{-1}} y_2. \tag{6}$$

Taking into account the error 'e' from quantizer 214, the output of delta-sigma modulator 200 may be written as:

$$y_{out} = y_1 + e, \quad (7)$$

which may be expanded to:

$$y_{out} = \frac{z^{-1}}{1-z^{-1}}(x_2 - y_{out}) + e, \quad (8)$$

from which the following may be obtained:

$$\frac{1}{1-z^{-1}}y_{out} = \frac{z^{-1}}{1-z^{-1}}\left(\frac{1}{1-z^{-1}}\right)(x - y_{out}) + e, \quad (9)$$

from which the output of delta-sigma modulator 200 may be obtained as:

$$y_{out} = z^{-1}x + (1-z^{-1})^2 e. \quad (10)$$

Therefore, the signal transfer function (STF) is:

$$\text{STF} = z^{-1}, \quad (11)$$

and the noise transfer function is:

$$\text{NTF} = (1-z^{-1})^2. \quad (12)$$

In one set of embodiments, quantizer 214 may be implemented using an N-level comparator, resulting in delta-sigma modulator 200 having a $\log_2 N$-bit output. In one embodiment, quantizer 214 may be configured to output a single bit, in which case quantizer 214 may be implemented as a simple 2-level comparator with a reference zero voltage, providing an output of 1 or 0, depending on the level of the input. For example, if the data input to interpolating filter 102 is a 10-bit binary number, any value from maximum value of '1111111111' to mid-level value '1000000000' may result in quantizer 214 outputting a 1, while any value that is '1000000000' or lower may result in quantizer 214 outputting a value of '0'. In various embodiments, quantizer 214 may be implemented in a variety of ways, and quantizer 214 may not need to be a comparator, but may be any circuit performing the same function. Those skilled in the art will also appreciate that quantizers for multiple-level modulators may be implemented as multiple-level comparators.

Figure 3:
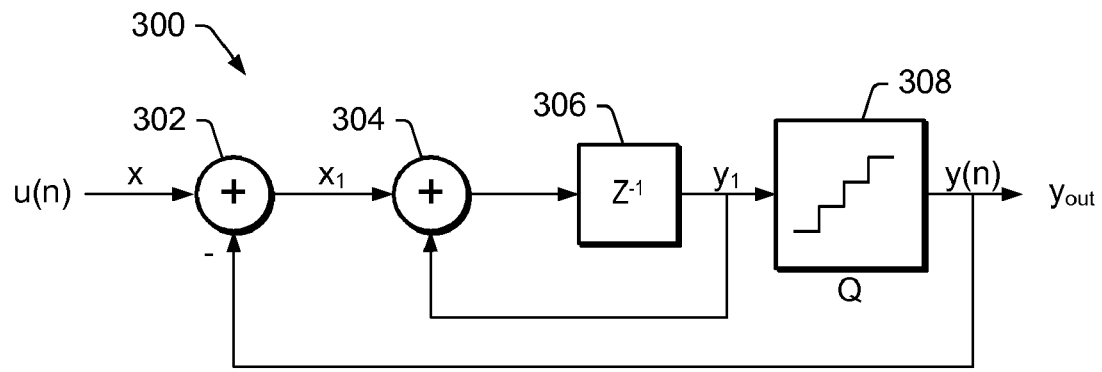
FIG. 3 shows a control diagram of one embodiment of a first order implementation of the digital modulator of FIG. 1.

In another embodiment, the delta-sigma modulator 104 may be a first-order delta-sigma modulator 300 as shown in FIG. 3. The output from interpolating circuit 102 may in this case be the input u(n) to delta-sigma modulator 300, which may comprise sigma blocks 302 and 304, and integrating block 306 forming one main feedback loop. For the delta-sigma modulator 300 of FIG. 3, the following equations may be obtained:

$$y_{out} = y_1 + e, \quad (13)$$

where, similar to delta-sigma modulator 200, 'e' may be the error from quantizer 308. Thus:

$$y_1 = (x_1 + y_1)z^{-1}, \quad (14)$$

$$y_1 = \frac{z^{-1}}{1-z^{-1}}x_1, \quad (15)$$

$$x_1 = x - y_{out}, \quad (16)$$

-continued $$y_{out} = \frac{z^{-1}}{1-z^{-1}}x_1 + e, \quad (17)$$

$$y_{out} = \frac{z^{-1}}{1-z^{-1}}(x - y_{out}) + e, \quad (18)$$

$$y_{out} = z^{-1}x + (1-z^{-1})e. \quad (19)$$

Therefore, the signal transfer function is:

$$\text{STF} = z^{-1}, \quad (20)$$

and the noise transfer function is:

$$\text{NTF} = 1 - z^{-1}. \quad (21)$$

Figure 4:
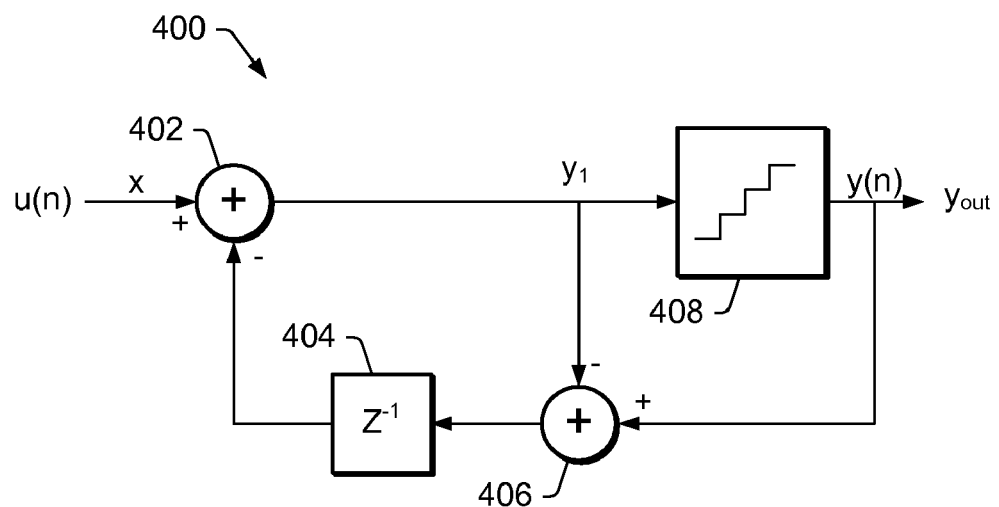
FIG. 4 shows a control diagram of one embodiment of a first order error-feedback implementation of the digital modulator of FIG. 1.

Yet another embodiment of delta-sigma modulator 104 may be delta-sigma modulator 400 shown in FIG. 4. Delta-sigma modulator 400 is a first-order error-feedback modulator, where instead of a most significant bit (MSB) output, a negative of the truncation error comprising the least significant bits (LSB) may be provided back to the input sigma node 402, via simple integrating function 404 and delta node 406. The output $y_{out}$ of delta-sigma modulator 400 may be provided by quantizer 408. The error-feedback structure shown in FIG. 4 may be simpler to implement than the first-order structure shown in FIG. 3, and may therefore be useful when attempting to reduce die-size, for example.

For the delta-sigma modulator 400 of FIG. 4, the following equations may be obtained:

$$y_{out} = y_1 + e, \quad (22)$$

where, similar to similar to delta-sigma modulators 200 and 300, 'e' may be the error from quantizer 408.

$$y_1 = x + z^{-1}(-e), \quad (23)$$

$$y_{out} = x + (1-z^{-1})e. \quad (24)$$

Therefore, the signal transfer function is:

$$\text{STF} = 1, \quad (25)$$

and the noise transfer function is:

$$\text{NTF} = 1 - z^{-1}. \quad (26)$$

In one set of embodiments, delta-sigma modulators 200, 300, and 400 may be implemented using a hardware description language, and synthesized to obtain information corresponding to expected respective die-size areas for each of the delta-sigma modulators. For example, using a 0.18μ TSMC process, the die-size area for delta-sigma modulator 200 may be 5987 μm$^2$, the die-size area for delta-sigma modulator 300 may be 4314 μm$^2$, and the die-size area for delta-sigma modulator 400 may be 3372 μm$^2$. If die-size area is of primary concern, for example, delta-sigma modulator 400 may be preferred.

Referring back to FIG. 1, the output of digital modulator 104 may be provided to low-pass filter 106 to obtain a linear analog voltage from the pulse density modulated signal generated by digital modulator 104, and fan 108 may then be powered by that linear voltage signal. In one set of embodiments, low-pass filter 106 may be a simple RC-filter, with the values for resistor 'R' and capacitance 'C' selected to filter out out-of-band noise. Therefore, low-pass filter 106 may not only operate to effectively obtain a linear voltage from the output of digital modulator 104, but may also act as a filter to filter out noise that may have been pushed into the high frequency regions as a result of the noise shaping performed by digital modulator 104. It should be mentioned again, that the output of digital modulator 104 may also be provided to fan 110, for example, when fan 110 is configured to be powered by pulses. Thus, driver circuit 100 is also a versatile circuit to provide either a series of successive pulses to power pulse-powered fans represented by fan 110, while also capable of generating a linear voltage to power linear-voltage-powered fans represented by fan 108. In either case, the present rotational speed of the fan may be the desired rotational speed of the fan as indicated by the data input (digital input signal) received by first circuit 102.

Figure 5:
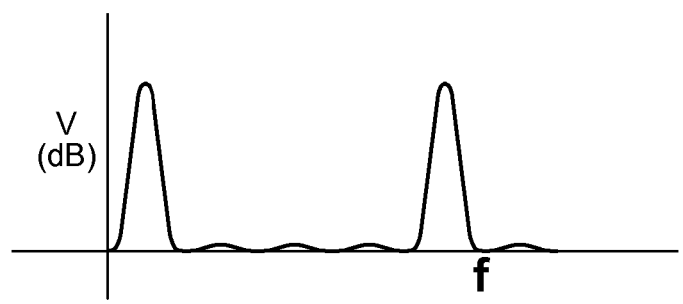
FIG. 5 shows a waveform representing the frequency spectrum of a signal provided at a first sampling frequency f.
Figure 6:
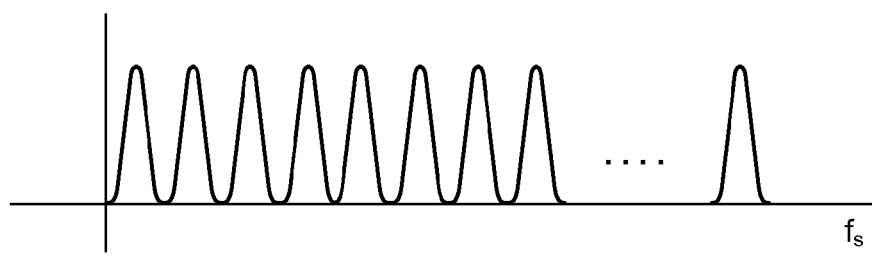
FIG. 6 shows the frequency spectrum of an upsampled version of the signal represented in FIG. 5, with an oversampling frequency $f_s$.
Figure 7:
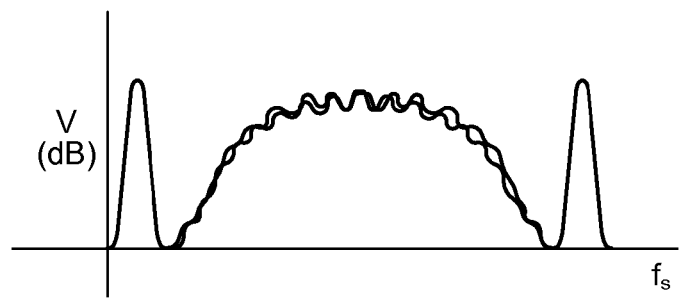
FIG. 7 shows the frequency spectrum of a modulated signal based on an interpolated version of the upsampled signal represented in FIG. 6.
Figure 8:
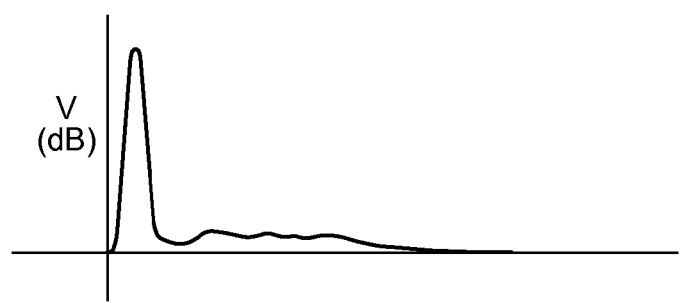
FIG. 8 shows the frequency spectrum of the modulated signal represented in FIG. 7 after passing through a low-pass filter.

FIGS. 5-8 provide example waveforms at various stages of the fan driver circuit 100 according to one set of embodiments. FIG. 5 represents the digital input signal, shown here by way of a frequency spectrum diagram in which the frequency 'f' represents a target sampling frequency, or in other words, a frequency at which first circuit 102 may receive the digital data input. FIG. 6 represents the upsampled digital input signal, again shown by way of a frequency spectrum diagram, in which frequency '$f_s$' is higher than frequency 'f', and is the oversampling frequency. Because the upsampled digital input signal may have large images left in its signal, first circuit 102 may also operate to generate interpolated values corresponding to the upsampled digital input signal by digitally filtering out the images. These interpolated values may then be provided to the digital modulator 104 as an interpolated signal, resulting in the output of digital modulator 104 shown in FIG. 7, again shown by way of a frequency spectrum diagram, with the center section indicating the quantization noise. Finally, FIG. 8 shows the frequency spectrum diagram of the final output that may be provided to the fan, once low-pass filtering has been performed on the output signal of the digital modulator 104 (from FIG. 7).

Therefore, an accurate series of successive pulses, and/or a good, clean linear voltage signal may be generated to power a fan. Moreover, when digital modulator 104 (from FIG. 1) is a single-bit delta-sigma modulator, a very precise pulse-powered fan drive may be implemented by powering the fan with the output of the modulator, which provides a series of successive pulses based on the digital input signal. For example, a first-order modulator may be used to implement a 10-12 bit resolution pulse-powered fan driver, and a second-order modulator may be used to implement a higher resolution (e.g. 20 bit)-powered fan driver. In general, fan drive circuits designed according to various principles of the present invention may be capable of delivering a series of successive pulses and/or a linear voltage to power fans based on a digital control signal. The fan drive circuits may be designed using digital design techniques, resulting in a smaller die size and more accurate fan control while consuming less power than similar analog circuits. The fan drive circuits may be implemented using standard-cell design techniques, making the circuits scanable, thereby also allowing increased testability.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A driver circuit for powering a fan, the driver circuit comprising:

a first circuit having an input configured to receive successive numeric values at a first rate, each of the successive numeric values indicative of a desired present rotational speed of the fan, the first circuit further having an output, and further configured to upsample the successive numeric values at a second rate higher than the first rate, and provide successive interpolated numeric values based on the upsampled successive numeric values;

a digital modulator configured to receive the successive interpolated numeric values from the output of the first circuit, and further configured to generate a corresponding pulse for each of the successive interpolated numeric values, to obtain a series of successive pulses; and a filter configured to generate a linear control voltage based on the series of successive pulses, wherein the filter is further configured to provide the linear control voltage to the fan for powering the fan, wherein in powering the fan using the linear control voltage, a present rotational speed of the fan corresponds to the desired present rotational speed of the fan indicated by the successive numeric values.

2. The driver circuit of claim 1, wherein the digital modulator is one of:

a second-order delta-sigma modulator;

a first-order delta-sigma modulator;

a first-order error-feedback delta-sigma modulator; and a digital modulator of any order.

3. The driver circuit of claim 1, wherein the filter is a low-pass filter.

4. The driver circuit of claim 1, wherein the second rate corresponds to an oversampling clock, wherein the oversampling clock is a system clock of a computer system, wherein the fan is configured to cool the computer system.

5. The driver circuit of claim 1, wherein the successive numeric values are generated by one of:

control hardware configured to control the fan; and control software executing on a computer system, wherein the fan is configured to cool the computer system.

6. The driver circuit of claim 1, wherein the digital modulator is an integrated circuit.

7. The driver circuit of claim 1, wherein a density of the series of successive pulses is indicative of the desired present rotational speed of the fan.

8. The driver circuit of claim 1, wherein each of the successive numeric values is a multiple-bit binary number.

9. The driver circuit of claim 1, wherein the modulator is further configured to generate each respective pulse of the series of successive pulses by taking into account an error between a value corresponding to the respective pulse, and a respective one of the successive interpolated numeric values to which the respective pulse corresponds.

10. The driver circuit of claim 1, wherein each pulse of the series of successive pulses has an amplitude corresponding to one of two possible values, a high value and a low value.

11. The driver circuit of claim 1, wherein the filter is further configured to filter out out-of-band noise from the linear control voltage.

12. A method for powering a fan, the method comprising:

receiving a digital control signal comprising numeric values indicative of a desired rotational speed of the fan;

upsampling the digital control signal at a frequency corresponding to an oversampling clock;

generating an interpolated digital signal based on the upsampled digital control signal;

generating a series of pulses based on the interpolated digital signal;

generating a linear control voltage from the series of pulses; and powering a fan with the linear control voltage;

wherein in response to said powering, a present rotational speed of the fan corresponds to the desired rotational speed of the fan indicated by the numeric values.

13. The method of claim 12, wherein said receiving the digital control signal comprises one of:

receiving the digital control signal from control hardware configured to control the fan; and receiving the digital control signal from control software executing on a computer system, wherein the fan is configured to cool the computer system.

14. The method of claim 12, wherein the oversampling clock is a system clock of a system, wherein the method further comprises cooling the system using the fan.

15. The method of claim 12, further comprising filtering out of band noise from the linear control voltage.

16. A cooling system comprising:

at least one fan;

a first circuit having an input and an output, wherein the input is configured to receive a numeric value indicative of a desired rotational speed of the at least one fan, wherein the first circuit is further configured to provide interpolated numeric values based on the numeric value at its output according to a specified rate;

a delta-sigma modulator configured to receive the interpolated numeric values from the output of the first circuit, and further configured to generate a series of successive pulses corresponding to the interpolated numeric values; and a filter configured to generate a linear voltage signal based on the series of successive pulses, wherein the filter is further configured to power the at least one fan with the linear voltage signal, wherein in powering the at least one fan with the linear voltage signal, a present rotational speed of the at least one fan corresponds to the desired rotational speed of the at least one fan.

17. The cooling system of claim 16, wherein the filter is a low-pass filter, and is further configured to filter out out-of-band noise from the linear voltage signal.

18. The cooling system of claim 16, wherein a density of the series of successive pulses is indicative of the desired rotational speed of the fan.

19. The cooling system of claim 16, wherein the delta-sigma modulator is one of:

a second order delta-sigma modulator;

a first order delta-sigma modulator;

a first order error-feedback delta-sigma modulator; or a delta-sigma modulator of higher than second order.

20. The cooling system of claim 16 configured in a computer system, wherein the at least one fan is configured to cool the computer system.

21. The cooling system of claim 20, wherein the specified rate is an oversampling frequency, wherein the oversampling frequency is obtained from a system clock of the computer system.

22. A method for powering at least one fan, the method comprising:

receiving a digital control signal comprising numeric values indicative of a desired rotational speed of the fan;

upsampling the digital control signal at a frequency corresponding to an oversampling clock;

generating an interpolated digital signal from the upsampled digital control signal;

generating a series of pulses based on the interpolated digital signal; and performing one of:

generating a linear control voltage from the series of pulses and powering the at least one fan with the linear control voltage, wherein in response to said powering, a present rotational speed of the fan corresponds to the desired rotational speed of the fan indicated by the numeric values; or powering the at least one fan with the series of pulses, wherein in response to said powering, the present rotational speed of the fan corresponds to the desired rotational speed of the fan indicated by the numeric values.

23. A driver circuit for powering at least one fan, the driver circuit comprising:

a first circuit having an input configured to receive a digital input signal indicative of a desired present rotational speed, the first circuit further having an output, and further configured to upsample the digital input signal at a second rate higher than the first rate, and provide an interpolated digital signal based on the upsampled digital input signal;

a delta-sigma modulator configured to receive the interpolated digital signal from the output of the first circuit, and further configured to generate a series of successive pulses corresponding to the interpolated digital signal;

wherein the delta-sigma modulator is further configured to provide the series of successive pulses to the at least one fan to power the at least one fan, wherein in powering the at least one fan using the series of successive pulses, a present rotational speed of the at least one fan corresponds to the desired present rotational speed indicated by the digital input signal.

24. The driver circuit of claim 23, further comprising:

a low-pass filter configured to generate a linear control voltage based on the series of successive pulses, wherein the low-pass filter is further configured to provide the linear control voltage to at least a second fan for powering the at least second fan, wherein in powering the at least second fan using the linear control voltage, a present rotational speed of the at least second fan corresponds to the desired present rotational speed indicated by the successive numeric values.

25. The driver circuit of claim 24, wherein the driver circuit is configured to simultaneously power the at least one fan and the at least second fan.

* * * * *